United States Patent [19]
Larbuisson

[11] Patent Number: 5,806,832
[45] Date of Patent: Sep. 15, 1998

[54] QUICK COUPLER THAT UNCOUPLES IN TWO STAGES

[75] Inventor: Patrick Larbuisson, Paris, France

[73] Assignee: Societe Y.T.O., Paris, France

[21] Appl. No.: 860,054

[22] PCT Filed: Oct. 10, 1996

[86] PCT No.: PCT/EP96/04400

§ 371 Date: Jun. 18, 1997

§ 102(e) Date: Jun. 18, 1997

[87] PCT Pub. No.: WO94/15779

PCT Pub. Date: May 1, 1997

[30] Foreign Application Priority Data

Oct. 20, 1995 [FR] France ................... 95 12371

[51] Int. Cl.[6] .................................................. F16L 37/28
[52] U.S. Cl. ........................................ 251/149.6; 285/316
[58] Field of Search .......................... 251/149.6; 285/316

[56] References Cited

U.S. PATENT DOCUMENTS

| | | | |
|---|---|---|---|
| 3,777,771 | 12/1973 | De Visscher | 251/149.6 |
| 4,483,510 | 11/1984 | Palau et al. | 251/149.6 |
| 5,290,009 | 3/1994 | Heilmann | 251/149.6 |
| 5,535,985 | 7/1996 | Larbuisson | 251/149.6 |

FOREIGN PATENT DOCUMENTS

| | | | |
|---|---|---|---|
| 1503989 | 12/1967 | France . | |
| 472623 | 6/1969 | France . | |
| 2514855 | 10/1981 | France . | |
| 375581 | 12/1989 | France . | |
| 6713686 | 10/1967 | Netherlands | 251/149.6 |

*Primary Examiner*—A. Michael Chambers
*Attorney, Agent, or Firm*—Harness, Dickey & & Pierce, P.L.C.

[57] ABSTRACT

The coupler comprises a male part (10) and a female part (1, 3) having a closure valve (5) at its upstream end, which valve is opened when the female and male parts are coupled together, and is closed during uncoupling thereof. The male part (10) has an outside surface provided with a collar (14). A latch (7) is provided in the female part to move in a radial direction and it includes a bore extending in the axial direction of the female part and through which the male part passes. On the surface of its bore, the latch includes two half-collars (11, 12) at least one of which is formed by two conical surfaces that are essentially sickle-shaped. The surface facing upstream of the half-collar (12) is situated upstream from the collar (14) and is suitable for fitting closely over at least 180° of the collar (14) of the male part when the male part is in a fully coupled position.

13 Claims, 5 Drawing Sheets

QUICK COUPLER THAT UNCOUPLES IN TWO STAGES

The invention relates to a quick coupler that uncouples in two stages enabling the pressure of a fluid in the coupler to be released prior to complete uncoupling, the coupler comprising a female part and a male part, the female part having a closure valve at its upstream end, which valve is open when the female and male parts are coupled together and is closed while they are being uncoupled, the male part having an outside surface provided with a collar, and the female part including a latch which is movable in a radial direction and which includes a bore extending in the axial direction of the female part and through which the male part passes, said latch including on the surface of its bore two retaining projections designed to co-operate separately with the collar of the male part, which projections are offset from each other in the axial direction.

French patent FR-A-1 503 989 discloses a quick coupler in which the latch includes two teeth for cooperating with a collar formed on the outer surface of the male part, said two teeth being disposed on either side of the male part on the latch so as to disengage the male part from the female part in two stages corresponding to the latch being pushed in once and released once. Nevertheless, the engagement of the male part in the sealing ring of the female part is such that the male part is not fully disengaged from the sealing ring or from the axial guidance portion, respectively, when it is in its intermediate position, thereby making rapid disengagement of the residual pressure downstream from the valve of the female part impossible, since that could result in whipping if the latch is released too quickly.

In order to mitigate that drawback, French patent application FR-A-2 514 855 proposes a quick coupler in which the latch includes three locking teeth, of which a first tooth and a second tooth are arranged in separate manner in the axial direction of the coupler inside a radial bore of the latch, thereby defining a certain axial distance over which the male part can move, and where said first and second teeth are arranged on the same side of the radial opening in the latch relative to the male part which is inserted through said radial hole of the latch, and where the third tooth is arranged in a position that is axially between the first and second teeth and on the opposite side thereto in the radial hole of the latch. In this way, a shoulder formed on the outer surface of the male part is locked in its fully coupled position by the first tooth, and a first operation of pushing in the latch disengages this first tooth from the shoulder on the male part while simultaneously causing the third tooth to engage in the axial passage of the shoulder in the male part during extraction so as to enable the male part to move backwards over an axial distance corresponding to the axial distance between the first and third teeth. Thereafter, the latch is released so that it returns into its initial position under drive from a spring, and the third tooth disengages from the shoulder of the male part as a result of this release, while simultaneously the second tooth engages in the axial passage of the shoulder in the male part in order to enable said male part to reverse again through an axial distance corresponding to the difference between the axial positions of the third and second teeth which retain the male part in the third axial position before said male part is finally disengaged by a second operation of pushing in the latch, thereby disengaging the second tooth from the shoulder of the male part and enabling the male part to be fully extracted, after which the latch is released and returns to its initial position.

In this manner, the male part is disengaged from its coupling with the female part by a sequence of two pushes on the latch, a first push making partial uncoupling possible during which the portion of the fluid under pressure that is to be found downstream from the valve can escape from the coupler prior to the male and female parts becoming fully uncoupled, thereby making it possible to avoid whipping due to said residual pressure on uncoupling, and in particular, in the event of the male and female parts being disengaged during the period before the valve has closed completely.

The object of the present invention is to provide a quick coupler that uncouples in two stages, and in particular a quick coupler that uncouples in two stages enabling the pressure of a fluid in the coupler to be released before complete uncoupling, while requiring a latch to be activated and related once only, and enabling the two parts to be maintained temporarily connected together after the latch has been released, and enabling the parts then either to be recoupled or else completely disengaged relative to each other, not by acting a second time on the latch as described in French patent application FR-A-2 514 855, but merely by pushing the male part against the female part, which is possible even while holding the pipe connected to the male part in order to give it a small axial jog.

This object is achieved by a coupler as described in the preamble, which is characterized by the fact that each of the two projections in the bore of the latch is in the form of a half-collar with at least one of them being formed by two conical surfaces that are essentially sickle-shaped, with at least the upstream-facing one of said surfaces being suitable for fitting closely over at least 180° of the collar of the male part.

Advantageously, the upstream-facing surface of the frustoconical second half-collar situated axially further downstream in the latch is also suitable for fitting closely over at least 180° of the collar of the male part.

The downstream facing surface of the frustoconical half-collar situated axially further upstream in the latch may surround the collar over less than 180°.

In an embodiment of the present invention, the latch is displaced radially by hand.

In another embodiment of the present invention, the latch is activated by the camming surface of a bushing which is moved axially by hand.

The female part may include a first sealing ring for sealing the inside of the female part relative to the outside when the valve is in an open position, and also seals said valve when it is in its closed position.

The female part may include a second sealing ring for sealing the coupling between the valve and the male part.

The valve may comprise an empty cylinder including a closed head portion and a cylindrical portion provided with holes that can be closed by said first sealing ring when the valve is closed, said cylindrical portion including two portions of different diameters of an axial bore in said cylindrical portion, forming between them a shoulder and a circumferential groove which serves as a seat for a second sealing ring, the larger diameter portion receiving a front portion of the male part.

The female part may include a spring urging the valve into its closed position.

The head portion of the valve may include a frustoconical surface which is suitable for fitting closely against a frustoconical surface of the first sealing ring.

The larger diameter portion of the cylindrical portion of the valve may include a plurality of radial bores downstream from the second sealing ring, making it possible, when the valve is closed and when the end of the male part is disengaged from the sealing ring of the valve, to exhaust the residual fluid under pressure that is to be found downstream from the valve towards the outside.

The female part may include, in a downstream position relative to the valve, a radial bore receiving the latch, said radial bore opening out to one side of the female part via an opening that is large enough to pass the latch, and may include, at the end opposite to said radial bore of the female part, an opening of smaller size in communication with the radial openings of the larger diameter portion of the cylindrical portion of the valve to enable the residual fluid downstream from the valve to escape to the outside of the female part prior to the male and female parts being fully uncoupled.

The coupler may include an opening formed in the front portion of the female part, or any other opening allowing the fluid downstream from the valve to be decompressed.

The invention is described below in detail with reference to the drawings, by way of example.

FIGS. 1 to 6 show a coupler constituting an embodiment of the present invention in six different positions Thus.

FIG. 2 is a longitudinal section (FIG. 2a) and a cross-section (FIG. 2b) through the latch of the coupler in a partially coupled-together position.

FIG. 3 is a longitudinal section (FIG. 3a) and a cross-section (FIG. 3b) through the latch of the coupler in a fully coupled-together position.

FIG. 4 is a longitudinal section (FIG. 4a) and a cross-section (FIG. 4b) through the latch of the coupler in a partially uncoupled safety position after pushing on the latch.

FIG. 5 is a longitudinal section (FIG. 5a) and a cross-section (FIG. 5b) through the latch of the coupler in a partially uncoupled safety position after the latch has been released.

FIG. 6 is a longitudinal section (FIG. 6a) and a cross-section (FIG. 6b) through the latch of the coupler in its position immediately before complete uncoupling.

Returning now to FIG. 1, there can be seen a coupler of the present invention in a fully uncoupled position, the left side of the figure showing the upstream side where there is a source of fluid under pressure, and the right side of the figure showing the downstream side towards which the fluid under pressure flows after the coupler has been fully coupled together.

Figure 1:
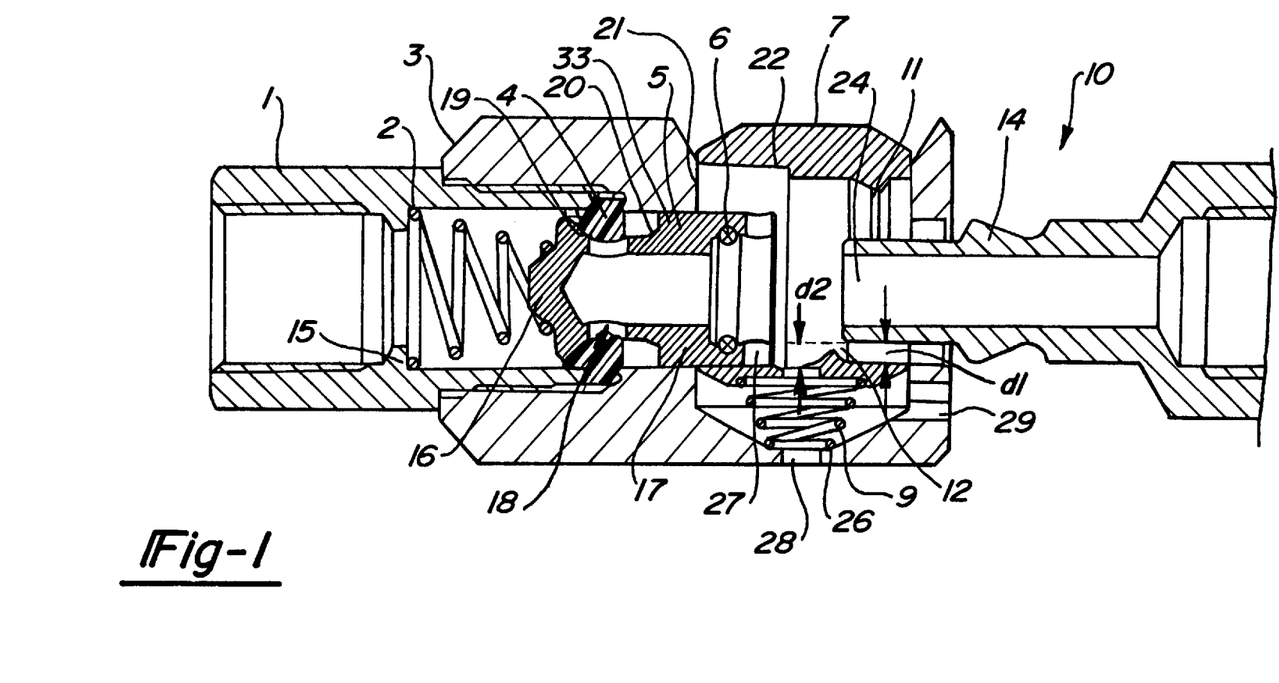
FIG. 1 is a longitudinal section through the coupler in its completely uncoupled position.

The female part includes a first bushing 3 referred to as an "outer" bushing, which includes an inside thread at its upstream end, and a second bushing 1 that includes an outside thread on its downstream end that is screwed into the inside thread of the outer bushing 3, thereby forming a housing for a sealing ring 4 which projects inwards from the two bushings.

The inner bushing 1 includes a shoulder 15 constituting a seat for a spring 2.

Inside the outer bushing 3 and also partially inside the inner bushing 1, there is a valve 5 that includes a head portion 16 and a cylindrical portion 17 which is closed at its upstream end by said head portion 16, said valve 5 being disposed so as to be axially slidable inside an axial opening through the outer bushing 3 whose inside diameter is substantially equal to the outside diameter of the cylindrical portion 17 of the valve 5 so as to guide the valve 5 accurately as it moves axially inside the outer bushing 3 during the various steps involved in coupling and uncoupling the male and female parts.

At its upstream end, the cylindrical portion 17 includes radial openings 18, while the head portion 16 at one end of the openings and the cylindrical portion at the other end thereof respectively include a frustoconical surface 19 and an annular surface as formed by a polygonal generator line 20 suitable for fitting closely against or being compressed against one of two corresponding surfaces of the sealing ring 4 when the valve 5 is respectively in its open position or in its closed position.

FIGS. 1, 2, 4, 5, and 6 show positions of the coupler in which the valve 5 is closed, i.e. in which the frustoconical surface 19 of the head element 16 engages closely against the frustoconical surface of the sealing ring 4 so as to seal hermetically the portion of the female part which is located upstream from the valve 5.

Figure 3A:
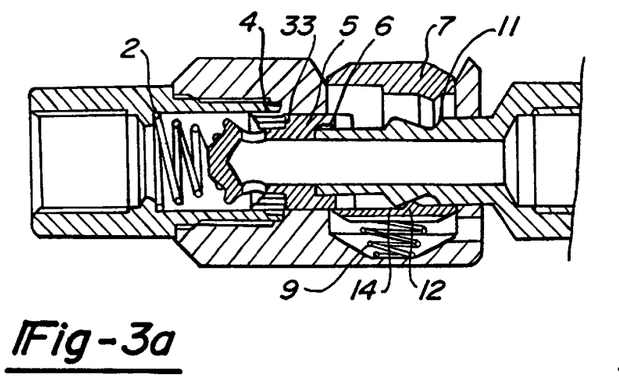
Figure 3B:
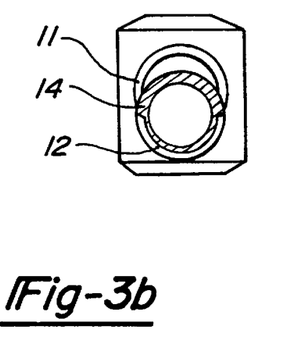

FIG. 3 shows the valve 5 in its open position in which the "polygonal" surface 20 is in contact with the sealing ring 4 so that the openings 18 are open, thereby allowing a fluid under pressure to pass from the upstream end of the female part to the inside of the valve 5 by passing through the openings 18.

The cylindrical portion 17 of the valve 15 includes an inside bore having two sections of different diameters, with the intersection of these two portions forming a shoulder followed by a circumferential groove in which there is received a sealing ring 6 which is designed to seal the inside of the valve 5 and the inside of the male part 10 towards the bore of the outer bushing 3 when the male part 10 is fully coupled inside the female part.

The outer bushing 3 includes a radial bore 21 of diameter greater than the diameter of its axial bore, and said radial bore 21 houses a latch 7 that is cylindrical in shape.

The latch 7 has a radial bore 22 that occupies a position that is more or less coaxial with the axial bore in the outer bushing 3, so as to allow or prevent the male part 10 to pass through the radial bore 22 of the latch 7.

The male part 10 includes an insertion end 24 having an outside diameter substantially equal to the inside diameter of the larger diameter portion of the cylindrical portion 17 of the valve 5 so that said end 24 of the male part 10 can be inserted into the cylindrical portion 17 of the valve until it comes into abutment against the sealing ring 6.

Downstream from the insertion end 24 of the male part 10, the male part includes a circumferential shoulder or collar 14 which is represented in FIG. 1 by its projection that includes a downstream slope and an upstream slope, the upstream slope being steeper than the downstream slope.

As can be seen in the longitudinal section of FIG. 1, the radial bore 22 of the latch 7, includes a projection 11 in the form of a frustoconical half-collar, said first half-collar 11 being situated adjacent to an accessible end of the latch 7, and a projection 12 in the form of a frustoconical half-collar, said second half-collar 12 being situated diametrically opposite the first half-collar 11 and being offset therefrom in an upstream direction.

Each of these two half-collars 11 and 12 is formed by a pair of surfaces that are sickle-shaped, i.e. each of them is curved to form a crescent extending over about 180° of a circle as defined by a radial section of the inside wall of the bore of the latch 7.

In FIG. 1 which is a longitudinal section through the coupler, it can be seen that each of the two half-collars 11 and 12 is represented by a projection having an upstream slope and a downstream slope, the downstream slope being steeper than the upstream slope, the downstream slope corresponding to the upstream slope of the collar on the male part, and the upstream slope corresponding to the downstream slope on the collar of the male part.

The upstream facing sickle-shaped surfaces of each of these two half-collars are suitable for fitting over at least 180° of the collar of the male part.

A spring 9 presses against a shoulder 26 of the radial bore 21 of the outer bushing 3 to urge the latch 7 into a rest position, as shown in FIG. 1.

In this completely uncoupled position as shown in FIG. 1, the fluid circuit is empty, fluid under pressure upstream being held back by the valve 5 which is urged against the sealing ring 4 by the spring 2 and by the pressure of the fluid, and the latch 7 under thrust from the spring 9 is in its rest position.

The larger diameter portion of the cylindrical portion 17 of the valve 5 includes a downstream sealing ring 6 for sealing the radial openings 27 and making it possible, in the closed position of the valve 5 as shown in FIG. 1, for communication to take place between the inside of the cylindrical portion 17 and the radial bore 21 of the latch 7.

Figures 4A, 4B:
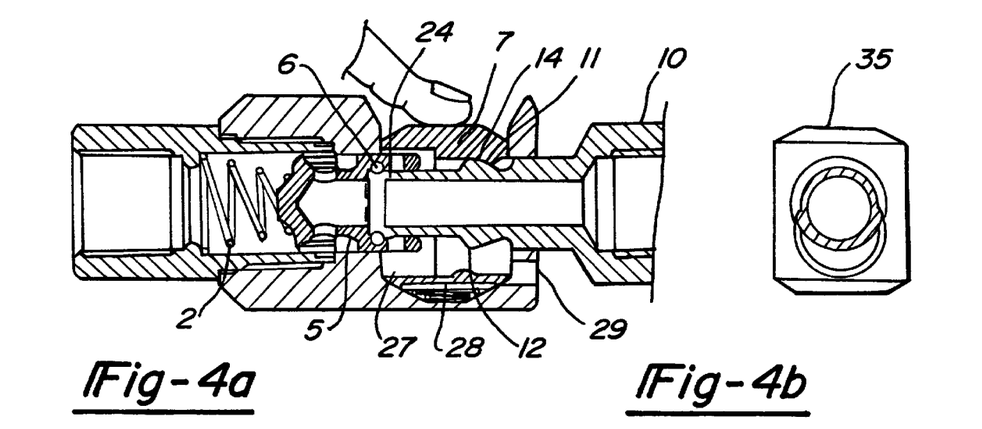

This radial bore 21 also includes an opening 28 close to the shoulder 26 which serves as a seat for the spring 9, thereby enabling residual pressure of fluid contained inside the cylindrical portion 17 of the valve 5 and inside the male part 10, and also in all of the downstream ducts, to escape to the outside during the stage of operation of the coupler that is shown in FIG. 4.

Figure 2A:
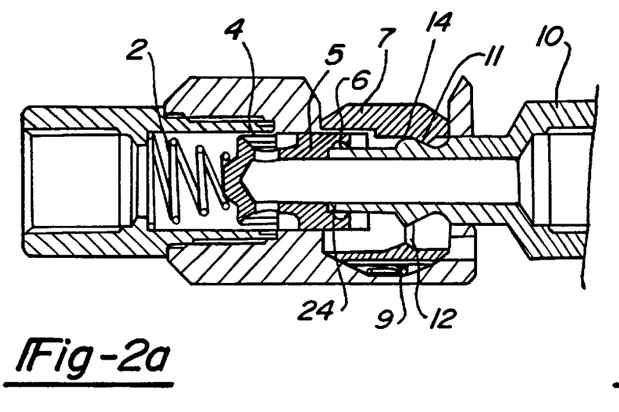
Figure 2B:
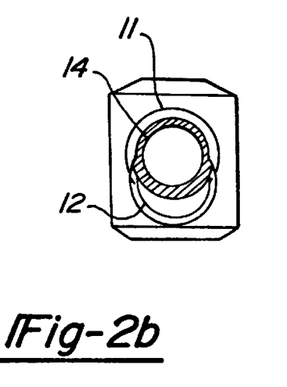

In order to obtain the partially coupled-together position as shown in FIG. 2, the male part 10 is pushed into the female part, thereby moving the latch 7 downwards by engagement of the collar 14 of the male part engaging the half-collar 11.

The spring 9 is compressed and the front end 24 of the male part 10 seals against the sealing ring 6. The valve 5 is still in sealed contact against its sealing ring 4.

In this position which is shown by FIG. 2, the male part is retained in the female part since the half-collar 11 surrounds at least 180° of the downstream face of the collar of the male part while fitting closely against the shape thereof. The position of the male part relative to the latch is shown particularly clearly in FIG. 2b.

To reach the fully coupled position, as shown in FIG. 3, the male part 10 continues to be pushed into the female part so that the head portion 16 of the valve 5 pushes back the spring 2, so that the "polygonal" surface 20 is no longer in contact with the sealing ring 4, and so that the openings 18 are opening and allow fluid to pass, whether under pressure or not, from the upstream end of the female part to the inside of the valve 5, by passing through the openings 18.

During this operation, the latch 7 moves upwards under thrust from the spring 9 so as to return to its initial rest position.

In this fully coupled-together position, the male part 10 is held in the female part since the half-collar 12 surrounds the downstream side of the collar 14 of the male portion over at least 180° while fitting closely over the shape thereof. The position of the male part relative to the latch is shown particularly clearly in FIG. 3b.

This locking in the coupled-together position is due to the fact that the conical sickle-shaped surface of the collar 14 cannot slide over an opposing surface having the same shape as the surface of the half-collar 12 if it extends over 180° or more of the sickle-shaped surface.

No locking takes place in the coupling direction because, as shown in FIG. 1, the distance d1 is less than the distance d2, which means that in the coupling direction, the half-collar 12 surrounds the collar 14 of the male part over less than 180°, whereas in the uncoupling direction, the half-collar 12 surrounds the collar 14 of the male part over 180°, or more.

Sealing relative to the outside is provided by the sealing ring 6 which bears against the front portion 24 of the male part 10, and by the shoulder 33 (FIG. 3a) of the valve 5 which presses against the sealing ring 4.

When it is desired to uncouple the male and female parts, hand pressure is applied to the accessible end of the latch 7 so that the latch moves downwards, thereby disengaging the collar 14 from the half-collar 12, after which the male part reverses in the disengagement direction until it is retained via its collar 14 by the half-collar 11 which is at a certain distance axially downstream from the half-collar 12.

This pushing in of the latch 7 thus enables the male part 10 to reverse under drive from the inside fluid pressure until it reaches an axial position in which the collar 14 comes into abutment against the half-collar 11. In this way, the half-collar 11 surrounds the collar 14 over 180° at least thereof, and fits closely to the shape thereof.

During this reversal, which terminates in a final position referred to as a "partially uncoupled" position as shown in FIG. 4, the valve 5 is pushed into its closed position by the spring 2 and by the upstream fluid pressure, and the end of the male part 10 disengages both from the sealing ring 6 and at least partially from the radial openings 27 in the cylindrical portion 17 of the valve 5 so as to allow fluid under pressure that is to be found downstream from the valve 5 to escape through the openings 27, the radial bore 21 in the latch 7, and finally the opening 28 or 29 so as to eliminate any force due to fluid pressure situated downstream from the valve 5, subsequently allowing disengagement to continue until the male part is fully disengaged by reversing the half-collar 11 into its initial position corresponding to the rest position of the latch without any danger of whipping which would normally occur if the male part is allowed to uncouple without restriction while the ducts downstream from the valve 5 are still under pressure.

The bore 29 parallel to the axis is provided in the front portion of the female part and acts as a second exhaust path for the pressure.

Figures 5A, 5B:
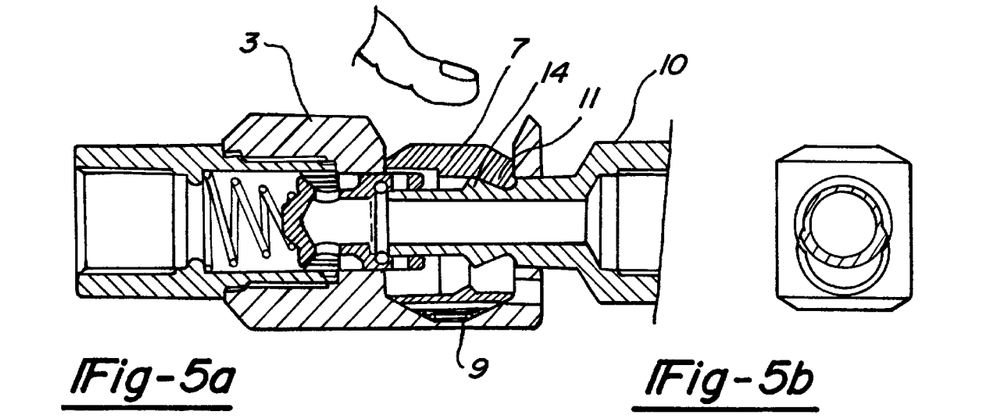

FIG. 5 shows the coupler in a partially uncoupled, safety, position after pressure on the latch 7 has been released. The half-collar 11 surrounds the collar 14 of the male part over at least 180°, and on the downstream side thereof, thus retaining the male part in the female part. This retention is provided by the thrust due to the pressure of the downstream circuit until the residual pressure has been released, and subsequently merely by friction between the two conical sickle-shaped surfaces of the half-collar 11 and of the collar 14, respectively, preventing the latch from returning to its rest position. The male part 10 is thus locked in this position and the latch 7 remains in its low position with the spring 9 compressed. In this position, the assembly remains in unstable equilibrium and the male part 10 cannot be withdrawn for the time being from the female part.

From this "partially uncoupled", safety position, it is possible either to recouple the two parts of the coupler by exerting axial thrust in the coupling direction until they each the fully coupled position as shown in FIG. 3, or else to disengage the two parts fully from each other.

Figures 6A, 6B:
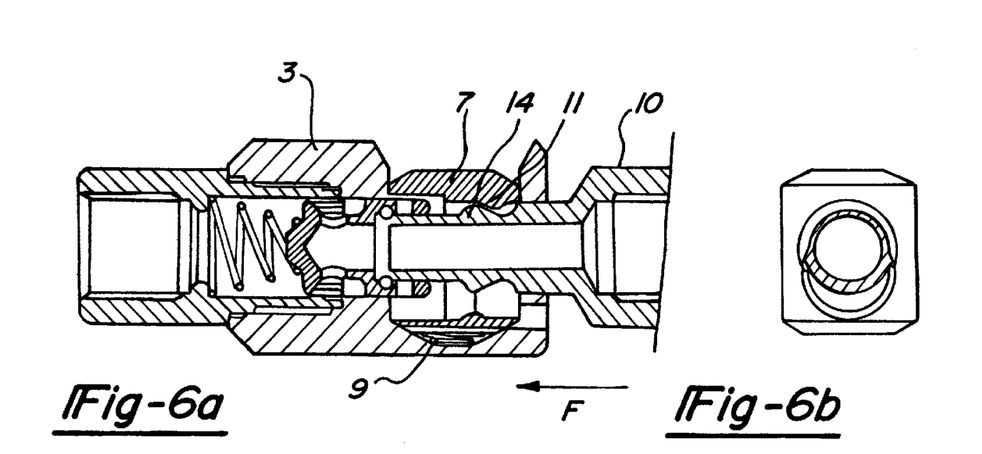

To separate the male part from the female part, a short-duration axial thrust is exerted in the coupling direction to disengage the two respective sickle-shaped surfaces of the half-collar 11 and of half of the collar 14, thereby separating the half-collar 11 from the collar 14. FIG. 6 shows the position immediately before full uncoupling, in which the male part is pushed in a little in the direction of arrow F. Full uncoupling is obtained by axial thrust on the male part in the coupling direction as shown by arrow F until the latch 7 is released and has risen to its initial, rest position under thrust from the spring 9. As a result, the half-collar 11 moves away from the axial path of the collar 14 and the male part 10 can be withdrawn so that the coupler is fully uncoupled, as shown in FIG. 1.

Figure 7:
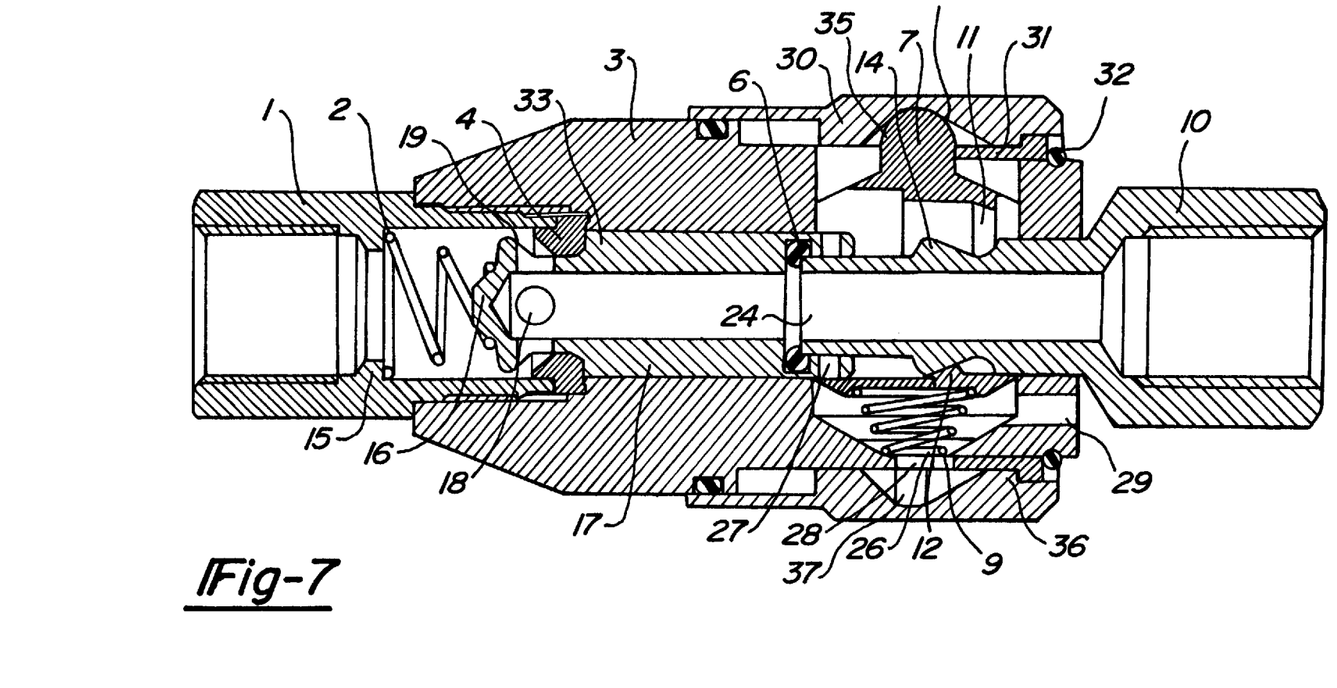
FIG. 7 is a longitudinal section through a coupler forming another embodiment of the present invention, in its fully coupled-together position.
Figure 8A:
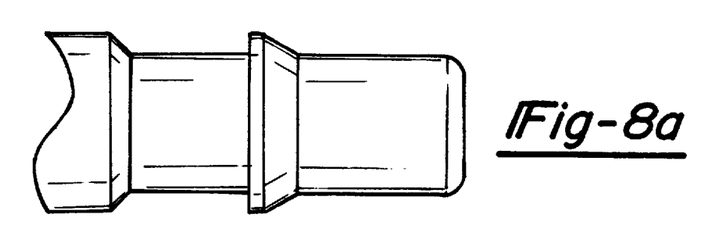
FIG. 8 shows four examples of male parts having collar profiles that are appropriate for the present invention.
Figure 8B:
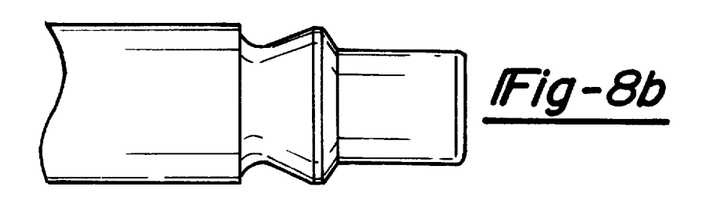
Figure 8C:
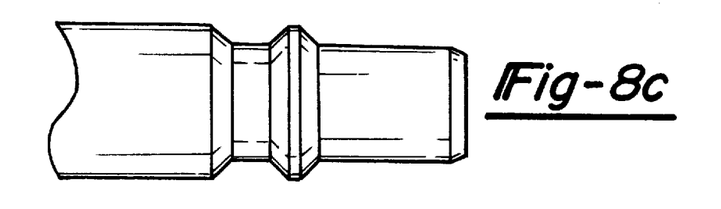
Figure 8D:
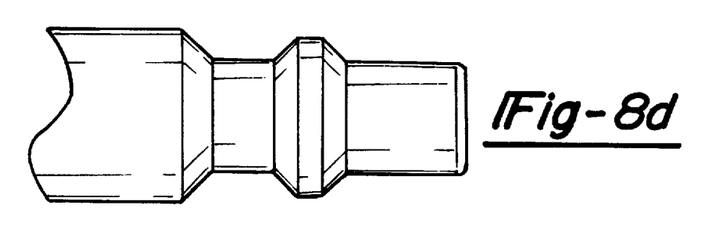

FIG. 7 which shows another embodiment of the present invention, shows a coupler that is identical to that of FIGS. 1 to 6, except that it includes a latch 7 which is actuated by the cam surface of a bushing and not directly by the hand applying thrust to the latch as in the embodiment of FIGS. 1 to 6. The reference numerals are identical to those used in FIGS. 1 to 6.

The coupler shown in FIG. 7 is in its fully coupled position.

The latch 7 has a spherical portion 35 and is surrounded by an outer bushing 30 that slides axially and that includes a cam surface 34 for co-operating with the spherical portion 35 of the latch to actuate the latch 7. The bushing 30 bears against a spring clip 32 via a ring 31. The collar 14 of the male part 10 is surrounded over at least 180° by the half-collar 12 of the latch 7 which is in its rest position. The valve 5 is open.

To reach the safety, uncoupled position, the bushing 30 is moved axially in translation in the upstream direction. The spherical portion 35 of the latch 7 is camped by the ramp 34 on the bushing 30, thereby causing the latch 7 to move perpendicularly to the longitudinal axis of the male part 10 and of the female part 3. This downwards movement enables the collar 14 to be disengaged from the half-collar 12. At this moment, the male part reverses under thrust from the spring 2 via the valve 5 and the sealing ring 6. When the spherical portion 35 of the latch 7 lies over the cylindrical portion 36 of the bushing 30, the half-collar 11 of the latch 7 surrounds the collar 14 of the male part over at least 180°, thereby retaining it in the female part 1. In this position, the valve 5 is again in abutment against its sealing ring 14, thus holding back the upstream pressure. The front portion 24 has left the sealing ring 6, thereby connecting the pressure on the downstream end to the atmosphere via the holes 28 and 29, and the orifices 27 through the valve 5. The bushing 30 in its rear position holds the latch 7 in this position so the male part cannot be disengaged. In its rear position, the bushing reveals a colored ring 31 indicating that the coupler is in its safety position.

To fully uncouple the coupler, the bushing 30 is returned to its initial position by being moved in the downstream direction. The spherical portion 35 of the latch 7 thus leaves the cylindrical bore 36 and returns to the housing 37 formed in the bushing 30. The latch 7 follows the ramp 34 under thrust from the spring 9. In this way, the collar 14 disengages from the half-collar 11, and the male part can be fully disengaged.

Around its periphery at its narrowest portion, the bushing 30 may include radial holes which make it easier to disengage the residual fluid escaping from the opening 28 during the intermediate stage of uncoupling.

FIG. 8 shows four examples of male parts having different collar profiles which are particularly well adapted as male parts for use in the present invention. The various collar profiles shown in FIGS. 8*a* to 8*d* are profiles complying with the following standards: ISO 6150 A (FIG. 8*a*); ISO 6150 B (US MIL C 4109) (FIG. 8*b*); ISO 6150 C (FIG. 8*c*); and ARO 210 (FIG. 8*d*). Clearly, any collar profile could be used providing the shape of the projections into the bore of the latch in the female part matches the shape of the collar of the male part in accordance with the present invention.

The invention is described above with reference to two possible embodiments, it being understood that numerous modifications could be provided by the person skilled in the art without going beyond the spirit of the invention.

This spirit of the invention lies in the principle whereby full uncoupling of a coupler is provided by pushing on the latch once only and then releasing it, enabling partial uncoupling to be obtained between the male and female parts and enabling them to be maintained in the safety, or partially uncoupled position, followed by axial thrust on the male part in the coupling direction that enables the male part to be fully disengaged. During the stage in which the male part is partially disengaged in the female part, the pressure of any fluid downstream from the valve can quickly escape, with this taking place before the full disengagement stage can be performed.

To enable the fluid under pressure downstream from the valve in the female part to escape, it is necessary to provide a reverse path for the male part while pressing down the latch, so that the male part can move from its fully coupled position to its partially uncoupled position, thereby enabling both the valve to be closed and the exhaust paths for said fluid to be opened.

I claim:

1. A quick coupler that uncouples in two stages enabling the pressure of a fluid in the coupler to be released prior to complete uncoupling, the coupler comprising a female part and a male part, the female part having a closure valve at its upstream end, the closure valve being open when the female and male parts are coupled together and is closed while they are being uncoupled, the male part having an outside surface provided with a collar, and the female part including a latch which is movable in a radial direction and which includes a bore having a surface, extending in the axial direction of the female part and through which the male part passes, said latch including on the surface of its bore an up-stream retaining projection and a down-stream retaining projection designed to cooperate separately with the collar of the male part, the up-stream retaining projection and the down-stream retaining projection being offset from each other in the axial direction, and are in the form of a half-collar with at least one of them having an up-stream conical surface and a down-stream conical surface the up-stream and down-stream conical surfaces being essentially sickle-shaped, with the up-stream conical surface being suitable for fitting closely over at least 180° of the collar of the male part.

2. A safety quick coupler according to claim 1, wherein said down-stream retaining projection comprises a up-stream conical surface suitable for fitting closely over at least 180° of the collar of the male part.

3. A safety quick coupler according to claim 2, wherein said up-stream retaining projection comprises up-stream conical surface which surrounds the collar over less than 180°.

4. A safety quick coupler according to claim 3, wherein the latch is displaced radially by hand.

5. A safety quick coupler according to claim 3, wherein the latch is activated by a camming surface of a bushing which is moved axially by hand.

6. A quick coupler according to claim 1, wherein the female part includes a first sealing ring disposed within the bore for sealing the female part relative to the outside surface of the male part when the valve is in an open position, and also seals said valve when it is in its closed position.

7. A quick coupler according to claim 6, wherein the female part includes a second sealing ring for sealing the coupling between the valve and the male part.

8. A quick coupler according to claim 7, wherein the valve comprises a cylinder including an axial bore, a closed head portion and a cylindrical portion provided with holes that can be closed by said first sealing ring when the valve is closed, said cylindrical portion including two portions with different diameters forming between them a shoulder and a circumferential groove which serves as a seat for said second sealing ring, the larger diameter portion receiving a front portion of the male part.

9. A quick coupler according to claim 8, wherein the female part includes a spring urging the valve into a closed position.

10. A quick coupler according to claim 9, wherein the head portion of the valve includes a frustoconical surface which is suitable for fitting closely against a frustoconical surface on the first sealing ring.

11. A quick coupler according to claim 10, wherein the larger diameter portion of the cylindrical portion of the valve includes a plurality of radial bores downstream from the second sealing ring.

12. A quick coupler according to claim 11, wherein the female part includes a radial bore for receiving the latch.

13. A quick coupler according to claim 12, wherein said female part includes an opening allowing the fluid downstream from the valve to be decompressed.

* * * * *